United States Patent
Bertoli et al.

(10) Patent No.: US 8,653,288 B2
(45) Date of Patent: Feb. 18, 2014

(54) DEODORIZED EDIBLE OIL OR FAT WITH LOW LEVELS OF BOUND MCPD AND PROCESS OF MAKING BY CARBOXYMETHYL CELLULOSE AND/OR RESIN PURIFICATION

(75) Inventors: Constantin Bertoli, Konolfingen (CH); Francois Cauville, Manno (CH); Annemarie Johanna Hendrika Schoonman, Attalens (CH)

(73) Assignee: Nestec S.A., Vevey (CH)

( * ) Notice: Subject to any disclaimer, the term of this patent is extended or adjusted under 35 U.S.C. 154(b) by 53 days.

(21) Appl. No.: 13/386,480

(22) PCT Filed: Jul. 19, 2010

(86) PCT No.: PCT/EP2010/060448
§ 371 (c)(1),
(2), (4) Date: Jan. 23, 2012

(87) PCT Pub. No.: WO2011/009841
PCT Pub. Date: Jan. 27, 2011

(65) Prior Publication Data
US 2012/0122983 A1    May 17, 2012

(30) Foreign Application Priority Data
Jul. 21, 2009   (EP) .................................... 09166004

(51) Int. Cl.
*C11B 3/00*      (2006.01)
*A23D 9/00*     (2006.01)
(52) U.S. Cl.
USPC ........................... 554/191; 554/224; 554/227
(58) Field of Classification Search
USPC ......................................... 554/191, 224, 227
See application file for complete search history.

(56) References Cited

FOREIGN PATENT DOCUMENTS

| JP | 8302382 A | * | 9/1996 |
|---|---|---|---|
| JP | 8302382 | | 11/1996 |
| JP | 2001049289 | | 2/2001 |
| JP | 2001049289 A | * | 2/2001 |
| RU | 2242507 | | 12/2004 |
| WO | 2007126594 | | 11/2007 |
| WO | WO 2007126594 A2 | * | 11/2007 |
| WO | 2010126136 | | 11/2010 |

OTHER PUBLICATIONS

Franke K et al: "Influence of chemical refining process and oil type on bound 3-chloro-1,2-propanediol contents in palm oil and rapeseed oil", Lebensmittel Wissenschaft Uno Technologie, vol. 42, No. 10, May 27, 2009, pp. 1751-1754.*

Zeunkova Z et al (1): "Occurrence of 3-chloropropane-1,2-diol fatty acid esters in infant and baby foods", European Food Research and Technology, vol. 228, No. 4, Oct. 2008, pp. 571-578.*

Zeunkova Z et al (2): "Fatty acid esters of 3-chloropropane-1,2-diol in edible oils.", Food Additives and Contaminants, vol. 23 (12), pp. 1290-1 298, Dec. 2006.*

Zelinkova, Z., et al., "Fatty acid esters of 3-chloropropane-1, 2-diol in edible oils." Food Additives and Contaminants, (2006), vol. 23, No. 12, pp. 1290-1298, XP009125455.

Zelinkova, Z., et al. "Occurrence of 3-chloropropane-1, 2-diol fatty acid esters in infant and baby foods", European Food Research and Technology; vol. 228, No. 4, Oct. 15, 2008, pp. 571-578, XP019702891.

Frankie, K., et al., "Influence of chemical refining process and oil type on bound 3-chloro-1, 2-propanediol contents in palm oil and rapeseed oil", LWT—Food Science and Technology, vol. 42, No. 10, May 27, 2009, pp. 1751-1754, XP026502436.

Salminen, S., et al. "Probiotics: how should they be defined?." Trends in Food Science & Technology vol. 10, No. 3 (1999), pp. 107-110.

Divinova, Veronika, et al. "Determination of free and bound 3-chloropropane-1, 2-diol by gas chromatography with mass spectrometric detection using deuterated 3-chloropropane-1, 2-diol as internal standard." Czech journal of food sciences, vol. 22, No. 5 (2004), pp. 182-189.

Robert, Marie-Claude, Jean-Marie Oberson, and Richard H. Stadler. "Model studies on the formation of monochloropropanediols in the presence of lipase." Journal of agricultural and food chemistry vol. 52, No. 6, (2004), pp. 5102-5108.

PCT International Search Report for International Application No. PCT/EP2010/060448 with a Mailing Date of Jun. 12, 2010, 5 pages.

* cited by examiner

*Primary Examiner* — Deborah D Carr
(74) *Attorney, Agent, or Firm* — K&L Gates LLP

(57) ABSTRACT

A process for making a deodorized edible oil or fat having a low level of bound MCPD (monochloro propanediol esters) and/or low level of bound 3-MCPD is described. The process comprises a step of contacting the oil or fat to a carboxymethyl cellulose or an ion exchange resin. The carboxymethyl cellulose can be a Blanose® cellulose gum and the resin can be a cationic resin. A deodorized vegetable oil or fat and a food product made there from is described. The food product can be an infant formula. It exhibits low levels of bound MCPD and/or low level of bound 3-MCPD. In one embodiment the oil or fat has a reduced level of free fatty acid as well as a limpid aspect and no off-flavors.

27 Claims, No Drawings

DEODORIZED EDIBLE OIL OR FAT WITH LOW LEVELS OF BOUND MCPD AND PROCESS OF MAKING BY CARBOXYMETHYL CELLULOSE AND/OR RESIN PURIFICATION

CROSS REFERENCE TO RELATED APPLICATIONS

The present application is a National Stage of International Application No. PCT/EP2010/060448, filed on Jul. 19, 2010, which claims priority to European Patent Application No. 09166004.3, filed on Jul. 21, 2009, the entire contents of which are being incorporated herein by reference.

FIELD OF THE INVENTION

This invention relates to refining, purification, production and processing of edible oil or fat. The invention further relates to producing purified edible vegetable oil, such as palm oil, with a limited amount of bound MCPD (monochloro propanediol esters).

BACKGROUND TO THE INVENTION

Edible oils or fats are usually submitted to a number of process steps to transform the crude oil or fat into an elaborated product having a defined degree of purity, and defined organoleptic properties.

These refining steps can include degumming, neutralization, bleaching, active carbon treatment, filtering, distillation and/or deodorization.

In particular a deodorization step usually complements the refining of the oil or fat by removing the majority of the volatile substances. The undesired volatile substances, responsible for off-taste, and off-odours, are usually more volatile than triglycerides and can be removed by a deodorizing step.

In a conventional deodorizing step, steam is injected into the oil or fat at high temperature (usually between 175° C. and 270° C.) and low pressure (typically under a vacuum of below 5 mbar).

Refined edible oil or fat is usually used in a number of food products. Refined oils, and in particular palm oil or fish oil are typical examples. The oils such as palm oil provide functionality in the food product and deliver the necessary lipids in the diet while delivering a particular profile of fatty acids. Also the oils serve as carriers for numerous lipid-soluble nutrients such as some lipophilic vitamins or for a number of desired flavours. In infant formula, for example, vegetable oils can represent up to 50% of the energy of the infant formula.

The invention below will be described in the context of edible vegetable oils as a non-limiting way of illustration. The invention however encompasses edible oils and fats of all sources (vegetable oils, animal fat, fish oil, milk derived fat, etc. . . . ).

Edible oils and fats, and in particular vegetable oils, are highly susceptible to oxidation and may be an unfortunate carrier to lipophilic undesired flavors, odors or colored compounds. In particular it is often desirable to obtain fully refined and deodorized vegetable oil with a low level of free fatty acids. Being highly susceptible to oxidation, the free fatty acids, in particular polyunsaturated fatty acids, are known to induce undesired organoleptic properties. Similarly oils and fats can comprise a number of undesired molecules. The undesired compounds can be carried over from the crude oil and/or appear during the numerous processing steps of the oils: for example oils are often treated at high temperature. The combination of high temperature with the presence of particular compounds (e.g. oxygen or precursors of undesired compounds) can lead to finished oils having particular undesired compounds (generally referred to as "contaminants").

While the aim of some process steps is to remove some undesired compounds, the same process steps can enhance the formation of other undesired compounds in the finished product. Hence a careful balance has to be found between desired effects and presence of undesired contaminants.

For example, in many instances it is desirable to purify the native palm oil in order to remove carotenoid molecules that are responsible for a brown/orange color. Indeed obtaining a limpid oil is often of importance for the visual quality of the finished product. Carotenoids are however best removed by a treatment at a relatively high temperature (e.g. heat bleaching). Such treatment at high temperature (typically above 200° C.), although necessary, can promote the oxidation of the oil and of contaminating molecules. In turn these molecules, oxidized, may create off-flavors. A balanced process is therefore necessary to mitigate all undesired chemical reactions while inducing the desired purification. The parameters of such processes are of high complexity (e.g. temperature, pressure, sequence, duration, added reactants, characteristics of the native oils or fats, equipment design, etc. . . . )

Monochloro propanediol esters (MCPD esters) have been identified as process-induced minor components in fully refined fats and oils. They are mainly formed during the deodorisation step. Two isomers at least have been shown to be formed, i.e. 2- and 3-MCPD esters, the latter being the predominant isomer. All fully refined fats and oils contain 2- and 3-MCPD esters; however, palm-based oils are generally oils with a relatively high content of 2- and 3-MCPD esters. While the exact formation process of the MCPD esters has not been totally understood, it has been observed that the temperature of the process, in particular the steam deodorization process, has a large impact: the higher the temperature, the higher is the amount of bound MCPD found in the vegetable oil. In particular temperature above 180° C., above 200° C., above 240° C. or above 270° C. induce respectively higher formation of bound MCPD.

Free 3-MCPD has been highlighted for its potential for adverse health effects and has been a subject of concern in regards to food products. It has recently been hypothesized that 3-MCPD esters could be at least partially hydrolysed into free 3-MCPD after ingestion. However there is currently no data indicating negative health effects of 3-MCPD esters (bound 3-MCPD) in food products. Nevertheless, in view of the potential for hydrolysis to free 3-MCPD, some authorities may regard bound MCPD as undesirable molecules in food products such as infant formula. It is of interest to monitor the levels of bound 3-MCPD in food products, especially infant formulae. Similarly it is of interest to investigate means to control the formation of bound 3-MCPD during the process steps used for the purification of edible oil or fat. By extension, similar considerations could in theory be applied to bound 2-MPCD.

Limiting the presence of bound 3-MCPD in the refined oils might be achieved by a careful selection of the oil or fat source or of the type of oil or fat used. However, the supply of material with low bound MCPD is uncertain and so far, no palm-based oil with guaranteed low levels of MCPD esters is commercially available.

Limiting the formation of bound MCPD during the process steps is another route to be explored.

There is a need to obtain an oil or fat that is low in bound MCPD while being free of other contaminants or undesired molecules.

There is a need for an edible oil or fat that is low in bound MCPD while being fully refined and deodorized. Such oil or fat has to have a neutral odour, and/or no off-taste, and/or a limpid aspect, and/or a low level in free fatty acids.

There is a need for an edible oil or fat that is low in bound MCPD while preserving all the other desirable lipo-soluble nutrients.

There is a corresponding need for a process that keeps the level of bound MCPD to a minimum level in the finished oil or finished product.

There is a need for a process of purifying an edible oil or fat that removes, or limits the formation, of bound MPCD or of precursors of bound MCPD.

There is finally a need for a process of purifying an oil or fat that leads to a low level of bound MCPD and has no off-odors and/or no off-taste and/or has a limpid aspect and/or has a limited level of free fatty acids.

In combination with the above needs, there is a need for obtaining oils or fats as described above and processes of making, that relates to a low level of bound 3-MCPD as bound 3-MCPD has been described as the MCPD compound of highest interest.

SUMMARY OF THE INVENTION

The invention relates to a process for purifying an edible oil or fat. The process comprises a step of deodorization for removing off-taste, off-odours and other volatile environmental contaminants and a step of contacting the oil or fat to an ion exchange resin. The step of contacting is such as a to limit the formation of bound MCPD in the oil or fat. The oil or fat, after the process, comprises an amount of 1000 µg or less of bound MCPD per kg of oil or fat.

In a first aspect the present invention provides a vegetable oil, preferably palm oil, palm olein or palm stearin derived from palm, that has a low content in bound MCPD while having no off-odours, off-flavors and/or having a low level in free fatty acids and an acceptable level of environmental contaminants.

In a second aspect, the present invention provides a food product, preferentially an infant formula, baby food, infant cereal or enteral nutritional composition that comprises the cited oil or fat while being fully adequate for the nutrition of the targeted babies, infants or patient. By extension the invention can relate to any type of food and beverages comprising edible oils or fats.

DETAILED DESCRIPTION OF THE INVENTION

Definitions: In this specification, the following terms have the following meanings:—

"infant" means a child under the age of 12 months.

"Babies" usually refers to young children below the age of 3.

"infant formula" is a nutritional composition intended for infants and babies. Infant formula can be complete nutritional compositions, i.e. able to fulfil all nutritional needs of the targeted infants or babies or can be complemented with other food.

"Enteral nutritional compositions" relate to nutritional products administered enterally, orally or by tube feeding to children or adults having particular nutritional needs. Usually those children or infants are most fragile patients (illness, infection, . . . ) and require specific nutrition.

"probiotic" means microbial cell preparations or components of microbial cells with a beneficial effect on the health or well-being of the host. (Salminen S., Ouwehand A., Benno Y. et al "Probiotics: how should they be defined", Trends Food Sci. Technol. 1999:10 107-10).

"MCPD" for the purpose of the present invention the term "MCPD" means "monochloro propanediol" and any of the molecule known under the chemical name 3-monochloro-1, 2-propanediol and/or 2-monochloro-1,3-propanediol and/or 1-monochloro-2,3-propanediol. Three isomers of MCPD are known in theory and are comprised in the general term "MCPD": 3-MCPD, 2-MCPD, 1-MCPD. The 3 isomers have the chloride molecule on respectively the sn-3, sn-2 and sn-1 position of the glycerol backbone. 3-MCPD (3-monochloro-1,2-propanediol) (MW 110.54) is a colourless, slightly oily liquid with a boiling point of 213° C. It is soluble in water and miscible in ethanol, acetone and diethyl ether. 1,3-DCP (1,3-dichloro-2-propanol) (MW 128.99) is a liquid with a boiling point of 174.3° C. It is soluble in water and miscible with ethanol and diethyl ether.

"bound MCPD": for the purpose of the invention "bound MCPD" corresponds to the MCPD residues that are esterified to fatty acids. It is corresponding to the amount of MCPD which can be released from any type of MCPD esters by hydrolysis. The quantity of bound MCPD is conventionally differentiated through the measurements between bound 2-MCPD and bound 3-MCPD.

"MCPD esters" are molecules comprising bound MCPD residues

"Bound 3-MCPD": for the purpose of the invention "bound 3-MCPD" corresponds to the amount of 3-MCPD that can be released from 3-MCPD esters (3-monochloro-1,2-propanediol esters) by hydrolysis.

Bound MCPD can be determined by any described method and in particular by the method described below.

All references to percentages are percentages by weight unless otherwise stated.

Process of the Invention:

The process of the invention is aimed at purifying a vegetable oil or fat. The oil or fat of the invention can be intended for human or animal consumption. The oil or fat of the invention is preferably palm-derived oil. Indeed such oil source has been shown to both (a) comprise a relatively high level of bound MCPD when processed conventionally and (b) be of significant economical value as palm oil and its derivatives are widely used in a number of food and feed products. Particularly suited for the invention is palm oil, palm olein and palm stearin: They have been shown to exhibit an elevated level of bound MCPD in conventional processes. The inventors have shown that various sources of oil are susceptible to lead to various content in bound MCPD. It is hypothesized that some vegetable oils contain impurities or contaminants in higher amount that can be precursors of MCPD or can enhance their formation during conventional processes. Fats and oils of various sources (vegetal or animal) have been shown to be of interest in the context of the present invention: The list of oils and fats of interest for the present invention comprises Palm Oil, Palm Olein, Palm Stearin, Palm Kernel, Medium Chain Triglyceride Oil (MCT), Anhydrous Milk Fat, Butteroil, and Fish Oil. On the contrary other oils are relatively low in bound MCPD after conventional processes: for example some animal fats extracted from tissue, Borage Oil, Blackcurrant Seed Oil, Butteroil, Cocoa Butter, Corn Oil, Cottonseed Oil, High Oleic Sunflower Oil, Mid Oleic Sunflower Oil, Olive Oil, Peanut Oil, Rapeseed Oil (low erucic acid), Low Linolenic Acid High Oleic Acid Rapeseed Oil, Rice Bran Oil, Safflower Oil, High Oleic Safflower Oil, Sesame Seed Oil, Sunflower Oil, Coconut Oil, Soybean Oil, and Wild Fats used for manufacturing cocoa butter equivalents.

The purification process of the invention comprises a step of contacting the oil or fat to a carboxymethyl cellulose or an ion exchange resin such as to limit the formation of bound MCPD in the oil or fat. The process of purifying an edible oil or fat comprises a step of deodorization for removing off-taste and off-odours and comprises a step of contacting said oil or fat to a carboxymethyl cellulose or an ion exchange resin for limiting the formation of bound MCPD in said oil or fat.

The resin can be a cationic ion exchange resin. In one embodiment the resin comprises a crosslinked polystyrene matrix optionally with sulfonate functional groups. In one embodiment the resin comprises Amberlite™ FPC11 Na from Rohm and Haas company (100 Independence Mall West, Philadelphia, Pa. 19106, USA). The resin can comprise 100% or between 80% and 100% of Amberlite™ FPC11 Na. In one embodiment the resin comprises 40% to 60% of a cationic resin, preferably Amberlite™ FPC11 Na from Rohm and Haas company (USA) and 40% to 60% of a resin having different functional groups.

In one embodiment the ion exchange resin comprises or consists of carboxymethyl cellulose.

In one embodiment the ion exchange resin comprises or consists of a resin derived from, or of a related-family to carboxymethyl cellulose. In one embodiment the ion exchange resin can comprise or consist of Hydroxypropyl cellulose, Methyl cellulose or Croscarmellose sodium. In one embodiment the resin or the carboxymethyl cellulose (CMC) can comprise or consist of a salt of CMC, preferably a sodium salt. The general wording carboxymethyl cellulose (CMC) in this document encompasses any known salt of CMC.

Carboxymethyl cellulose can also be known as E466 in standard nomenclature, or be abbreviated CMC.

The term "carboxymethyl cellulose" is the present document is equivalent to "a carboxymethyl cellulose" and indicates any material comprising or consisting of carboxymethyl cellulose, or of a derivative of carboxymethyl cellulose, or of a salt of carboxymethyl cellulose.

The carboxymethyl cellulose can be a cellulose derivative with carboxymethyl groups bound to some of the hydroxyl groups of the glucopyranose monomer. In one embodiment the carboxymethyl cellulose comprises Blanose® Cellulose Gum purified sodium carboxymethylcellulose from Hercules International GmbH (Eurohaus, Rheinweg 11, CH-8200 Schaffhausen, Switzerland). In one embodiment the Blanose® Cellulose Gum is the sodium salt of carboxymethylcellulose. The carboxymethylcellulose can comprise 100% or between 80% and 100% of Blanose® Cellulose Gum. In one embodiment the carboxymethylcellulose comprises 40% to 60% of a Blanose® Cellulose Gum, preferably 9M31F from Hercules International GmbH (Switzerland) and 40% to 60% of a carboxymethylcellulose having a different substitution range, particle size distribution and viscosity.

The invention comprises a step of deodorization, preferably a conventional deodorization. Deodorization can be considered as a particular way of stripping an oil: the deodorization is made with the specific aim of reducing off-tastes, off-odors, free fatty acids and certain environmental contaminants. Conventionally deodorization of oils or fats is performed by a flow of steam (water in gaseous form).

The process of the invention can comprise a step of contacting the oil or fat to a carboxymethyl cellulose or an ion exchange resin to such a way that the oil or fat, after the contacting step and the deodorization step, comprises an amount of 1000 µg or less of said bound MCPD per kg of oil or fat. In the process of the invention the contacting of the oil or fat with the resin limits the formation of bound MCPD in the oil or fat, such as the oil or fat, after the process, comprises an amount of 1500 µg or less, 1000 µg or less, 800 µg or less, 750 µg or less, 500 µg or less. 250 µg or less, 100 µg or less, of the bound MCPD per kg of oil or fat (weight/weight). Specifically the bound 3-MCPD in the oil or fat, after the process, comprises an amount of 1450 µg or less, 950 µg or less, 800 µg or less, 700 µg or less, 500 µg or less, 250 µg or less, 100 µg or less, of bound MCPD per kg of oil or fat (weight/weight). The inventors believe that while the lower the MCPD the better, achieving a level of 1000 µg or less per kg of oil represents a good compromise between the various quality parameters of the processed oil (low free fatty acid content, no off-flavors or off-odors, low impurities, etc. . . . ).

In one embodiment the process of the invention is such as to obtain an oil or fat, after the process, comprising an amount of 950 µg or less of said bound 3-MCPD per kg of oil or fat.

In one embodiment the carboxymethyl cellulose or the resin binds, at least partially, bound 3-MCPD, or bound 2-MCPD or precursors of bound 3-MCPD or precursors of bound 2-MCPD.

In one embodiment the purification process of the invention comprises a step of stripping the oil with an inert gas. Stripping conventionally consist of contacting the oil with a gas in such a way that the gas can extract or entrain the most volatile components and/or impurities and/or contaminants from the oil. A typical stripping is made by bubbling/injecting a gas under pressure under the surface of the oil. Conventionally pressure, time of stripping, design of equipment and temperature are key process parameters. Stripping is usually performed at relatively high temperature. Oil stripping can be performed at temperature above 140° C., above 180° C., above 200° C., 240° C. or up to 270° C. in order to remove specific undesired molecules or impurities from the oil. The stripping can be performed using nitrogen as the inert gas. Other inert gases are contemplated within the scope of the invention (such as Argon or Xenon). Deodorization can also be performed with other stripping media. Deodorization with nitrogen has been described with the specific intend to have mild deodorization conditions. However deodorization with nitrogen has not been described together with the specific action of preventing the formation of bound MCPD in the processed oil or fat. Also the described nitrogen deodorization does not maintain process parameters that are sufficiently stringent to enable an efficient deodorization. In one embodiment the process of the invention comprises a step of stripping the oil or fat with nitrogen, wherein the contacting step, the stripping steps and the deodorization step are at least partially concomitant.

The step of contacting the oil or fat with the carboxymethyl cellulose or the resin can be performed in 2 separate process steps. In one embodiment the contacting and the deodorization can however be performed in one single concomitant step.

In one embodiment the contacting step is operated at temperature of between 35° C. and 85° C., preferentially between 50° C. and 70° C. In another embodiment the temperature for the contacting step can be elevated to between 50° C. and 100° C. (in order to enable an elevated binding rate of the carboxymethyl cellulose/resin and/or better processability of the oil or fat). The temperature must be sufficiently high to allow for (a) low viscosity and (b) a efficient removal of contaminants, impurities and/or undesired compounds from the oils. These compounds or molecules will in most instances been removed according to their volatility. In one embodiment the deodorization step is operated at a temperature sufficient to induce the formation of MCPD in said oil, preferably above 140° C. or above 180° C., most preferably between 180° C. and 250° C.

In one embodiment the process of the invention comprises the contacting of the oil or fat with the carboxymethyl cellulose or the resin for a duration of between 1 hour and 6 hours, of less than 5 hours, of between 30 minutes and 180 minutes or between 20 and 70 minutes. It is believed that a short contacting time may allow for a most efficient processing while a time of contacting must be sufficiently long to allow for the optimum action of the carboxymethyl cellulose or the resin and removal of the undesired compounds from the oil or fat. In one embodiment the whole process, the deodorization step is performed for a duration of less than 5 hours, less than 2 hours or less than 1 hour. Mild process conditions and/or fast process may help to prevent the formation of undesired compounds such as bound MCPD.

In one embodiment the contacting step is operated with a quantity of resin between 2 and 100 bed volumes, preferably between 5 and 50 bed volumes. In one embodiment the contacting step is operated with a quantity of carboxymethyl cellulose between 0.5 to 20% (g/100 g), preferably between 1 to 5% (g/100 g).

The bound MCPD can be present in the crude oil before the refining process, can have been formed during a previous process such extraction, purification, storage etc. . . . Additionally the inventors have found that bound MCPD are mainly formed during the deodorization process, in particular conventional steam deodorization process. Without being bound by the theory, it has sometimes been hypothesized that the chloride present in water (regular industrial water) used for the conventional steam deodorization can, under adequate pressure and temperature, trigger the formation of bound MCPD. This may however not be the only cause of formation of MCPD esters. It is indeed hypothesized that the formation of MCPD esters is governed by at least 4 variables:

The mono- and diglyceride content
The chloride content
The proton activity
Carriers, e.g. carotenoids, tocotrienols, tocopherols, to bring the chloride in close contact with precursors to form bound MCPD during processing.

It is believed that the rate of formation will be based on the energy brought. If enough energy is brought, the reaction can take place as the 4 variables will get enough energy to interact together to form MCPD esters. Energy is brought according to the deodorisation temperature. Protons are certainly liberated by the steam, or when the steam is getting in contact with the oil at high temperature. Without being bound by the theory, it is believed that the carboxymethyl cellulose or the resin selectively binds some molecules involved in the formation of MCPD esters during the deodorization process, such as precursors of bound 3-MCPD or precursors of bound 2-MCPD. The carboxymethyl cellulose or the resin may also directly bind molecules derived from MCPD (for example esters) that may be initially present in the material. Hence the resin may help to reduce the load of MCPD precursors. The steam deodorization process hence leads to a reduced formation of bound MCPD in the oil or fat after the process.

In one embodiment the process of the invention is characterized by a reduction of bound 3-MCPD of at least 2 folds, at least 3 folds, at least 5 folds or at least 10 folds, when compared to a conventional purification process (of the same oil) that comprises a conventional steam deodorization but does not comprise the step of contacting said oil or fat with a carboxymethyl cellulose or a resin.

In one embodiment of the invention the deodorization conditions (temperature, duration, time, pressure, equipment design, . . . ) are sufficiently stringent to form, at least partially, the bound MCPD identified in the processed oil. In one embodiment the bound MCPD is formed, at least in part, during the deodorization step. In one embodiment the invention relates to a process wherein the deodorization is operated at a temperature sufficient to induce the formation of bound MCPD in the oil or fat. Preferably said step(s) is/are performed at a temperature between 140° C. and 270° C., most preferably between 180° C. and 250° C. The correct balance in the process conditions have indeed to be found for eliminating the undesired compounds (i.e. temperature and/or other process conditions sufficiency stringent), while minimizing the formation of other undesired compounds such as bound MCPD (that formation being usually correlated with temperature or stringency of the process).

Edible Oil or Fat of the Invention:

By some aspects the edible oil or fat of the invention relates to an oil or fat that is deodorized (i.e. that exhibits the intrinsic properties of a deodorized oil) and that comprises less than 1000 µg of bound MCPD per kg of deodorized oil or fat, preferentially less than 750 µg of bound MCPD per kg, most preferably less than 500 µg, less than 250 µg or less than 100 µg per kg (weight/weight).

The invention also relates to an oil or fat that is deodorized (i.e. that exhibits the intrinsic properties of a deodorized oil) and that comprises less than 950 µg of bound 3-MCPD per kg of deodorized oil or fat, preferentially less than 700 µg of bound 3-MCPD per kg, most preferably less than 500 µg, less than 250 µg or less than 100 µg per kg (weight/weight).

It is believed that through conventional processes, the refined/purified oil or fat does most of time always inherently acquire a relatively high level of bound MCPD. Indeed their process conditions (such as the use of steam deodorization followed by other drastic conventional process) always triggers the formation of bound MCPD at a significant rate. Further, conventional fractionation can partition MCPD esters preferably in the olein fraction.

In one embodiment the deodorized oil or fat comprises less than 0.5 g of free fatty acids per 100 g of oil or fat, preferably less than 0.25 g, less than 0.2 g, less than 0.1 g or less than 0.05 g. The presence of free fatty acids and their quantity is a good indicator of the deodorization process that the oil or fat was submitted to. Without being bound by the theory it is believed that obtaining both a low free fatty acid and a low bound MCPD content is not possible in a conventional process.

In one embodiment the oil or fat comprises less than 0.5 g of moisture per 100 g of oil or fat, preferably less than 0.25 g or less than 0.1 g. The moisture content can also be an indicator of the stringency of the process parameters and obtaining both a low moisture content and a low bound MCPD level may not conventionally possible, even further with a low level of free fatty acid.

In one embodiment of the invention the deodorized oil is a processed vegetable oil derived from palm, preferably palm oil, palm olein and/or palm stearin.

Product of the Invention:

In one embodiment the invention relates to a food product that comprises the deodorized oil or fat described above. The food product is preferably an infant formula, baby food, and/or infant cereal and/or enteral nutritional composition. The food product can however be selected from any food product for which the level of bound MCPD is critical to be maintained at a low level. In one embodiment the food product comprises an amount between 0.2% and 35% (weight/weight), preferentially between 1% and 30%, or between 1% and 10% (weight/weight) of the oil or fat of the invention. The food product according to the invention can comprise an amount of 1000 µg or less, 900 µg or less, 750 µg or less, 500 µg or less, 250 µg or less, 100 µg or less of bound MCPD per kg of extracted fat (in case of a food product, the amount of bound MCPD is calculated over the amount of fat extracted from the product to take into account that not all fat can be extracted). The food product according to the invention can comprise an amount of 950 µg or less, 850 µg or less, 700 µg or less, 500 µg or less, 250 µg or less, 100 µg or less of bound 3-MCPD per kg of extracted fat.

Other Components of the Invention:

In one embodiment the food product comprises probiotics, preferably live probiotics. The probiotics can be present in the food product at a dose of from $10^3$ to $10^{12}$ colony forming units (cfu), more preferably from $10^5$ to $10^8$ cfu per gram of food product. Without being bound by the theory is hypothesized that bound MCPD can affect the survival of the live probiotics in the food product. Hence there is an advantage at keeping a low bound MCPD level in food product comprising probiotics such as infant formula with probiotics. Probiotics can be those conventionally described for food products in the literature.

In one embodiment the food product comprises prebiotics. Prebiotics can synergistically enhance the survival rate of the probiotics.

Other Chloropropanols:

Monochloro propanediols (MCPD) belongs to a group of chemicals called chloropropanols. Other chloropropanols include di-chloro-propanols (DCP), such as 1,3-dichloro-2-propanol (1,3-DCP) and 2,3-dichloro-2-propanol (2,3-DCP). Without being bound by the theory it is believed that DCP can be formed in foods as a result of processing conditions when edible oils and fats are processed under stringent conditions. The mechanism for their formation is however not fully understood. The present invention has been described in the context of MCPD. By extension it is believed that the principle, concept, embodiments, processes and products of the present invention can apply to DCP. Indeed DCP and MCPD are chemically related and can have similar reactivity. Their formation processes can hence be closely related. Similarly their reduction or limitation in edible oils and fats or products made therefrom can be closely related. Similar considerations apply to bromopropanols and derivatives thereof.

The invention will now be further illustrated by reference to the following examples:

EXAMPLE 1

As starting vegetable oil, crude palm oil was used (ref 701062-001 from Golden Jomalina Food Industries, Selangor Danul Ehsan, Malaysia). The crude palm oil was conventionally bleached using:
  0.5% TriSyl® Silica (adsorbent, W. R Grace)
  2% Tonsil Supreme 110FF (bleaching earth, Süd Chemie)
  500 ml of the bleached palm oil was completely melted at 60° C. and mixed with x ml of the cation exchange resin FPC 11 Na from Rohm and Haas to achieve the desired oil/resin ratios (see below for oil/resin ratios).

The oil resin blend was kept under gentle stirring for 1 h at 60° C. in a double jacketed glass reactor.

The resin was separated from the oil through a decantation funnel.

The bleached palm oil and the resin treated palm oil were stripped with steam or nitrogen as follows.
  Deodorization/stripping Parameters:
  Oil quantity: 350 g oil
  Deodorization parameters: 235° C., 3 h, 2-3 mbar, heating to the deodorization temperature: ca. 15 min, cooling of the stripped oil to 50° C.: ca. 45 min
  Stripping medium:—Steam (11 g or 0.3% based on oil), injected as long as the oil is under vacuum
    Nitrogen, injected as long as the oil is under vacuum (low temperature liquified Nitrogen, available from Pangas, Dagmersellen, Switzerland).

The stripping conditions have been fully described in the co-pending patent application by Constantin Bertoli and François Cauville: "A deodorized edible oil or fat with low levels of bound MCPD and process of making using an inert gas." The description thereof is incorporated by reference.

Several trials have been performed, varying the oil/resin ratio. The ratio is expressed in bed volume (BV). 1 BV (Bed volume) is 1 m³ solution per m³ resin. Among others, the following oil/resin ratios have been tested and corresponding results are reported in the below table:

2 BV-500 ml oil/250 ml resin
  5 BV-500 ml oil/100 ml resin
  50 BV-500 ml oil/10 ml resin The contacting time (1 h) and temperature treatment (60° C.) have been kept constant.

TABLE 1

Comparison of the content in bound 3-MCPD and bound 2-MCPD of bleached palm oil processed in a conventional way and processed according to the invention with a resin. Some samples of the invention were additionally treated with a step of nitrogen stripping.

|  | Bound 3-MCPD (µg/kg) | Bound 2-MCPD (µg/kg) |
| --- | --- | --- |
| Conventional process (trial 1) | 1340 | 660 |
| Conventional process (trial 2) | 1230 | 510 |
| Resin 5 BV/steam stripping (according to invention) | 340 | 200 |
| Resin 50 BV/steam stripping (according to invention) | 480 | 250 |
| Resin 2 BV/nitrogen stripping (according to invention) | 220 | 120 |
| Resin 50 BV/nitrogen stripping (according to invention) | 440 | 250 |

Resulting Oil:

The oil has a clear/neutral/limpid aspect without visible inclusions or impurities. The oil has a no off-flavors or off-taste as assessed by a panel of trained experts. The free fatty acid content in the oil is less than 0.1 g FFA/100 g oil expressed as palmitic acid. The oil has a moisture content of less than 0.1 g moisture/100 g oil. The oil is according to the invention and comprises 220 µg/kg and 480 µg/kg of bound 3-MCPD. Other samples have shown values of below or at 220 µg/kg and below or at 730 µg/kg of bound 3-MCPD. The comparison with the conventional process shows a significant decrease in MCPD levels for the samples according to the invention.

EXAMPLE 2

An infant formula is prepared with a vegetable oil of the invention: This composition is given by way of illustration only. The protein source is a mix of casein and whey protein (60%-40%). The fat portion comprises 30% of palm olein.

| Nutrient | per 100 kcal | per litre |
|---|---|---|
| Energy (kcal) | 100 | 670 |
| Protein (g) | 1.83 | 12.3 |
| Fat (g) | 5.3 | 35.7 |
| Linoleic acid (g) | 0.79 | 5.3 |
| α-Linolenic acid (mg) | 101 | 675 |
| Lactose (g) | 11.2 | 74.7 |
| Prebiotic (100% GOS) (g) | 0.64 | 4.3 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1.0 |
| Niacin (mg) | 1 | 6.7 |
| Vitamin B6 (mg) | 0.075 | 0.50 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |
| Fe (mg) | 1.2 | 8 |
| I (µg) | 15 | 100 |
| Cu (mg) | 0.06 | 0.4 |
| Zn (mg) | 0.75 | 5 |
| *Lactobacillus reuteri* DSM 17938 | $2.10^7$ cfu/g of powder | |

A comparison between some commercial infant formulae and the infant formulae A and B according to the invention is shown in the below table. The infant formulae A and B are based on the above description and differ by the commercial source of the oil. The expected values of bound 3-MCPD and bound 2-MCPD are provided in the below table.

| | results mg/kg of extracted fat | |
|---|---|---|
| Description | Bound 3-MCPD | Bound 2-MCPD |
| Commercial Infant Formula 1 | 1.73 | 0.50 |
| Commercial Infant Formula 2 | 2.25 | 0.76 |
| Commercial Infant Formula 3 | 3.13 | 1.13 |
| Commercial infant Formula 4 | 3.12 | 1.34 |
| Infant Formula A according to invention | Total MCPD: | 1 mg/kg |
| Infant Formula B according to invention | Total MCPD: | 0.75 mg/kg |

EXAMPLE 3

As starting vegetable oil, crude palm oil was used (ref 701062-001 from Golden Jomalina Food Industries, Selangor Danul Ehsan, Malaysia). The crude palm oil was conventionally bleached using:
  0.5% TriSyl® Silica (adsorbent, W. R Grace)
  2% Tonsil Supreme 110FF (bleaching earth, Süd Chemie)
  500 ml of the bleached palm oil was completely melted at 60° C. and mixed with x g of Blanose® Cellulose Gum purified sodium carboxymethyl cellulose from Hercules International GmbH to achieve the desired oil/CMC ratios (see below for oil/CMC ratios).

The oil carboxymethyl cellulose blend was kept under gentle stirring for 1 h at 60° C. in a double jacketed reactor. The carboxymethyl cellulose was separated from the oil through a chamber filter press.

The bleached palm oil and the carboxymethyl cellulose treated palm oil were stripped with steam as follows:
Deodorization/stripping Parameters:
  Oil quantity: 350 g oil
  Deodorization parameters: 235° C., 3 h, 2-3 mbar, heating to the deodorization temperature: ca. 15 min, cooling of the stripped oil to 50° C.: ca. 45 min
  Stripping medium:—Steam (11 g or 0.3% based on oil), injected as long as the oil is under vacuum The stripping conditions have been fully described in the co-pending patent application by Constantin Bertoli and François Cauville: "A deodorized edible oil or fat with low levels of bound MCPD and process of making using an inert gas." The description thereof is incorporated by reference.

Several trials have been performed, varying the substitution range, the particle size distribution and the viscosity of the Blanose® Cellulose Gum. The following oil/carboxymethyl cellulose (=Oil/CMC) ratio has been tested:
  2%-443 g oil/8.8 g carboxymethyl cellulose
  Corresponding results are reported in the below table:
  The contacting time (1 h) and temperature treatment (60° C.) have been kept constant.

TABLE 1

Comparison of the content in bound 3-MCPD and bound 2-MCPD of bleached palm oil processed in a conventional way and processed according to the invention with a carboxymethyl cellulose.

| | Bound 3-MCPD (µg/kg) | Bound 2-MCPD (µg/kg) |
|---|---|---|
| Conventional process | 700 | 290 |
| Blanose ® Cellulose GUM 9M31F/steam stripping (according to invention) | 160 | n.d |
| Blanose ® Cellulose GUM 7MXF/steam stripping (according to invention) | 150 | n.d |
| Blanose ® Cellulose GUM 12M31XF/steam stripping (according to invention) | 150 | n.d |
| Blanose ® Cellulose GUM 12M31F/steam stripping (according to invention) | 280 | 110 |

Resulting Oil:

The oil has a somewhat clear/neutral/limpid aspect without visible inclusions or impurities. The oil has a no off-flavors or off-taste as assessed by a panel of trained experts. The free fatty acid content in the oil is less than 0.1 g FFA/100 g oil expressed as palmitic acid. The oil has a moisture content of less than 0.1 g moisture/100 g oil. The oil is according to the invention and comprises 150 µg/kg and 280 µg/kg of bound 3-MCPD. The comparison with the conventional process shows a significant decrease in MCPD levels for the samples according to the invention.

Analytical Methods

Measurement of Bound MCPD in Fats and Oils:

The quantification of bound MCPD is executed by capillary gas chromatography with mass spectrometric detection, deuterated 3-MCPD as internal standard and 1-palmitoyl-2-stearoyl-3-chloropropane as recovery. The method follows the teaching of V. Divinová, B. Svejkovská, M. Doležal, J. Velíšek in Czech J. Food Sci. 22(5), 182-189 (2004), "*Determination of Free and Bound 3-Chloropropane-1,2-diol by Gas Chromatography with Mass Spectrometric Detection using Deuterated 3-Chloropropane-1,2-diol as Internal Stan-*

*dard*". This publication describes the hydrolysis (methanolysis) procedure of the MCPD esters. Prior to the methanolysis step the oil to be analyzed is washed with water in a liquid extraction with hexane. The derivatization of the hydrolyzed MCPDs is done with heptafluoro-butyrylimidazole (HFBI) described by M-C. Robert, J-M. Oberson, R. Stadler. "*Model Studies on the Formation of Monochloropropanediols in the Presence of Lipase*", J. Agric. Food Chem. 52, 5102-5108 (2004). The accuracy of the method for dosing bound MCPD is estimated at about ±15%. When measuring a complete food product, the quantification of bound MCPD is made as out of the total fat extracted from said food product.

The invention claimed is:

1. A process of purifying an edible oil or fat comprising the steps of:
   deodorizing to remove off-taste and off-odours; and
   contacting the oil or fat with a carboxymethyl cellulose or an ion exchange resin to limit the formation of bound MCPD in the oil or fat, and the oil or fat is selected from the group consisting of palm oil, palm olein, and palm stearin.

2. The process of claim 1 wherein the step of contacting the oil or fat with a carboxymethyl cellulose or an ion exchange resin causes the oil or fat, after the contacting step and the deodorization step, to comprise not more than 1000 µg of bound MCPD per kg of oil or fat.

3. The process of claim 1, wherein the step of contacting is prior to the step of deodorization.

4. The process of claim 1, wherein the oil or fat, after the process, comprises not more than 950 µg of bound 3-MCPD per kg of oil or fat.

5. The process of claim 1, wherein the resin, at least partially binds at least one MCPD selected from the group consisting of bound 3-MCPD, bound 2-MCPD, precursors of bound 3-MCPD, and precursors of bound 2-MCPD.

6. The process of claim 1, wherein the bound MCPD is formed, at least in part, during the deodorization step.

7. The process of claim 1, wherein the step limiting the formation of bound MCPD causes a reduction of bound 3-MCPD of at least 2 folds when compared to a conventional purification process that comprises a conventional steam deodorization but does not comprise the step of contacting the oil or fat with a resin.

8. A deodorized edible oil or fat comprising less than 1000 µg of bound MCPD per kg of the deodorized edible oil or fat, and the edible oil or fat comprises an oil selected from the group consisting of deodorized palm oil, palm olein, and palm stearin.

9. The edible oil or fat of claim 8 comprising less than 950 µg of bound 3-MCPD per kg of the deodorized edible oil or fat.

10. The deodorized oil or fat of claim 8, wherein the oil or fat has less than 0.5 g of free fatty acids per 100 g of oil or fat.

11. A food product comprising deodorized edible oil or fat comprising less than 1000 µg of bound MCPD per kg of the deodorized edible oil or fat in an amount between 0.2% and 35% (weight/weight), the edible oil or fat comprising an oil selected from the group consisting of deodorized palm oil, palm olein, and palm stearin, and wherein the food product comprises less than 950 µg of bound 3-MCPD per kg of extracted fat.

12. The food product of claim 11, wherein the food product is selected from the group consisting of an infant formula, baby food, infant cereal and an enteral nutritional composition.

13. A food product comprising deodorized edible oil or fat produced by the steps of: deodorizing to remove off-taste and off-odours; and contacting the oil or fat with a carboxymethyl cellulose or an ion exchange resin to limit the formation of bound MCPD in the oil or fat, in an amount between 0.2% and 35% (weight/weight) of the food product and comprises less than 950 µg of bound 3-MCPD per kg of extracted fat, and the oil or fat comprises an oil selected from the group consisting of deodorized palm oil, palm olein, and palm stearin.

14. A process of purifying an edible oil or fat comprising the steps of:
   deodorizing to remove off-taste and off-odours; and
   contacting the oil or fat with a carboxymethyl cellulose to limit the formation of bound MCPD in the oil or fat, and the carboxymethyl cellulose is a cellulose derivative with carboxymethyl groups bound to some of the hydroxyl groups of the glucopyranose monomer.

15. The process of claim 14 wherein the step of contacting the oil or fat with a carboxymethyl cellulose or an ion exchange resin causes the oil or fat, after the contacting step and the deodorization step, to comprise not more than 1000 µg of bound MCPD per kg of oil or fat.

16. The process of claim 14, wherein the step of contacting is prior to the step of deodorization.

17. The process of claim 14, wherein the oil or fat, after the process, comprises not more than 950 µg of bound 3-MCPD per kg of oil or fat.

18. The process of claim 14, wherein the resin at least partially binds at least one MCPD selected from the group consisting of bound 3-MCPD, bound 2-MCPD, precursors of bound 3-MCPD, and precursors of bound 2-MCPD.

19. The process of claim 14, wherein the bound MCPD is formed, at least in part, during the deodorization step.

20. The process of claim 14, wherein the step limiting the formation of bound MCPD causes a reduction of bound 3-MCPD of at least 2 folds when compared to a conventional purification process that comprises a conventional steam deodorization but does not comprise the step of contacting the oil or fat with a resin.

21. A process of purifying an edible oil or fat comprising the steps of:
   deodorizing to remove off-taste and off-odours; and
   contacting the oil or fat with a carboxymethyl cellulose to limit the formation of bound MCPD in the oil or fat, and the contacting step is operated with a quantity of carboxymethyl cellulose of between 1 and 20% (g/100 g).

22. The process of claim 21 wherein the step of contacting the oil or fat with a carboxymethyl cellulose or an ion exchange resin causes the oil or fat, after the contacting step and the deodorization step, to comprise not more than 1000 µg of bound MCPD per kg of oil or fat.

23. The process of claim 21, wherein the step of contacting is prior to the step of deodorization.

24. The process of claim 21, wherein the oil or fat, after the process, comprises not more than 950 µg of bound 3-MCPD per kg of oil or fat.

25. The process of claim 21, wherein the resin at least partially binds at least one MCPD selected from the group consisting of bound 3-MCPD, bound 2-MCPD, precursors of bound 3-MCPD, and precursors of bound 2-MCPD.

26. The process of claim 21, wherein the bound MCPD is formed, at least in part, during the deodorization step.

27. The process of claim 21, wherein the step limiting the formation of bound MCPD causes a reduction of bound 3-MCPD of at least 2 folds when compared to a conventional purification process that comprises a conventional steam deodorization but does not comprise the step of contacting the oil or fat with a resin.

* * * * *